June 20, 1950     O. F. QUARTULLO     2,512,380
SLIDING BALL AND SOCKET COUPLING
Filed May 28, 1947

INVENTOR
ORPHEUS F. QUARTULLO
BY *Hyde, Meyer, Baldwin & Doran*
ATTORNEYS

Patented June 20, 1950

2,512,380

UNITED STATES PATENT OFFICE 2,512,380

SLIDING BALL AND SOCKET COUPLING

Orpheus F. Quartullo, South Euclid, Ohio, assignor to The Euclid Road Machinery Co., Euclid, Ohio, a corporation of Ohio Application May 28, 1947, Serial No. 750,972

2 Claims. (Cl. 74—99)

This invention relates to improvements in a sliding ball and socket coupling.

An object of the present invention is to provide an improved coupling having coacting ball and socket members wherein one of the members drives the other and in the course of the driving movement there would normally tend to be a separation of the ball and socket members. The present invention maintains a smoothly working connection between the ball and socket members no matter what the relative position of the parts.

Other objects and advantages of the present invention will be apparent from the accompanying drawings and description and the essential features thereof will be set forth in the appended claims.

In the drawings,

Fig. 5 is a sectional view taken along the line 5—5 of Fig. 4 with parts shown in section to more clearly illustrate the construction; while

Figure 1:
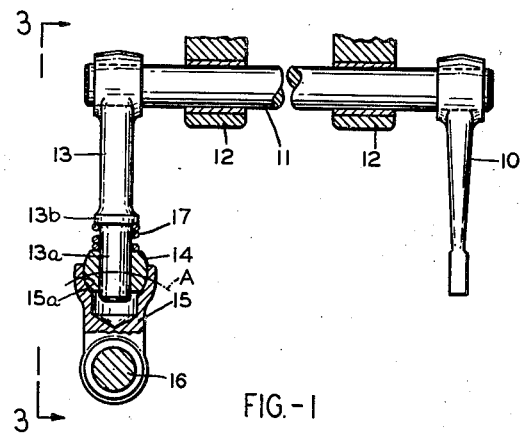
Fig. 1 is a side elevational view of one form of my invention with certain of the parts shown in central section to more clearly show the parts.
Figure 2:
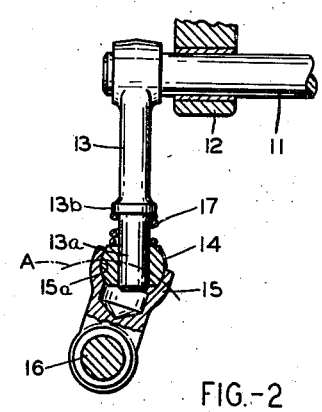
Fig. 2 is a view of the left-hand portion of Fig. 1 showing another position of the parts.
Figure 3:
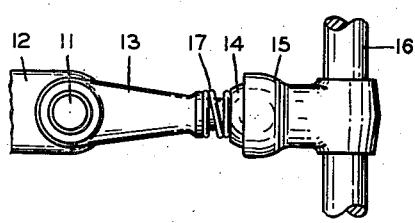
Fig. 3 is an end elevational view taken from the position of the line 3—3 of Fig. 1.

In Figs. 1, 2 and 3, I have chosen to show my invention in connection with a selective gear shifting device used in automotive vehicles without however intending to limit my invention to such use. In the drawings, a gear shift lever is indicated at 10 which is movable to several positions toward the right and left, as viewed in Fig. 1, to select a desired rail in the gear shift assembly. The lever 10 is fixed on a rod 11 which is slidably mounted in the brackets 12. An arm 13 is also fixed on the rod 11 and extends downwardly. On the lower end of this arm a ball 14 is slidably mounted on the cylindrical end 13a of the arm 13. This ball smoothly engages a socket 15a which is integral with the arm 15 which in turn is mounted on a shaft 16 to be oscillated by the shaft. A helical spring 17 embraces the cylindrical arm portion 13a and is compressed between the shoulder 13b on the arm and the ball 14.

It results from the above construction that oscillation of the shaft 16 moves the arm 15 about the shaft axis as a center so that the center of the coacting ball and socket surfaces moves in the arcuate path indicated at A. Referring to Fig. 2, one such position of the arm 15 is indicated where the arm has been oscillated in a clockwise direction from the position shown in Fig. 1. This carries the arm 13 and the rod 11 toward the right, as viewed in Figs. 1 and 2. If the ball 14 were fixed on the arm 13 there would be a tendency for the ball and socket to separate as the end of arm 15 moves away from the arm 13 in the arcuate path A. If carried sufficiently far this would separate the coacting ball and socket, or in any case, it would cause binding between the ball and socket surfaces. I overcome these objections by means of the spring 17 which constantly urges the ball 14 into snug engagement with the socket 15a. Thus, at all times, I maintain a smooth driving engagement between the arcuate surfaces of the ball 14 and of the socket 15a. Without my improvement, the parts would tend to stick, especially since the driving effect for rod 11 is applied at the end of the arm 13.

Figure 4:
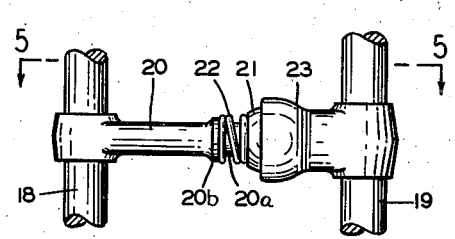
Fig. 4 is an end elevational view similar to Fig. 3 but showing a modified form of the invention.
Figure 5:
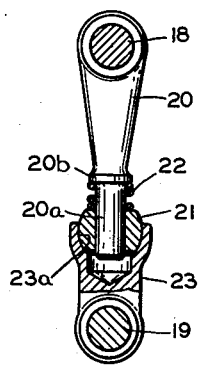
Figure 6:
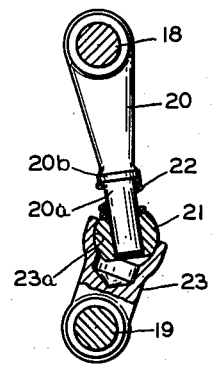
Fig. 6 is a view similar to Fig. 5 showing another position of the parts.

It will be noted in Figs. 1, 2 and 3 that the shaft 16 and the rod 11 are at right angles to each other. In Figs. 4, 5 and 6, I have shown my invention utilized between a driving and driven shaft where the two are parallel to each other.

In Figs. 4 to 6, the shafts 18 and 19 are parallel to each other. Arm 20 is fixed to shaft 18 and carries at its free end a ball 21 which is slidable on the cylindrical arm portion 20a. A helical spring 22 is held between the shoulder 20b and the ball 21 to constantly urge the ball outwardly. Arm 23 is fixed on shaft 19 and is provided at its free end with a socket 23a which conforms to the outer surface of the ball 21 so as to provide smoothly fitting arcuate surfaces. As the parts are oscillated from the position of Fig. 5 to that of Fig. 6, there is a tendency for the ball and socket surfaces to separate, inasmuch as their respective associated arms tend to move away from each other in oppositely directed arcs. One such position is shown in Fig. 6. If the ball 21 were in the fixed position on arm 20 as shown in Fig. 5, the ball and socket would be practically separated in Fig. 6. Instead, the ball 21 has been driven outwardly on the arm portion 20a by the spring 22 so as to maintain a snug fit between the ball 21 and the socket 23a. This gives a smooth driving connection between the ball and socket parts of the coupling in various oscillated positions of the arms 20 and 23.

In the drawings I have shown the ball slidable on its arm, but obviously, the parts might be reversed and the socket portion might be made slidable upon its arm to maintain continuous contact between the coacting ball and socket surfaces.

What I claim is:

1. In combination, an arm oscillatable in a plane in an arc about a fixed pivot, an arm coupled therewith and movable in a linear path parallel to said plane, and coupling means between said arms for providing said mentioned coupling of said second named arm with said first named arm and comprising a ball member on one of said arms, a socket member on the other of said arms, said ball member adapted to engage in said socket member, one of said members slidably mounted on its associated arm, and means resiliently urging said slidable member toward the other of said members.

2. In combination, an arm oscillatable about a fixed pivotal axis, a rod having its axis in a plane parallel to said first named axis, said rod mounted for sliding movement in a line at an angle to said axis, a second arm rigid with said rod and extending toward said first named arm, a socket in the end of said first named arm, a ball slidable longitudinally of said first named arm and adapted to engage in said socket, and spring means urging said ball toward said socket, whereby said ball snugly engages said socket during linear movement of said ball and arcuate movement of said socket.

ORPHEUS F. QUARTULLO.

REFERENCES CITED

The following references are of record in the file of this patent:

UNITED STATES PATENTS

| Number | Name | Date |
|---|---|---|
| 260,285 | Dancel | June 27, 1882 |
| 1,119,362 | McCain | Dec. 1, 1914 |
| 1,736,849 | Douglas | Nov. 26, 1929 |
| 1,881,560 | Heitger | Oct. 11, 1932 |
| 1,947,033 | Bush | Feb. 13, 1934 |
| 2,019,073 | Cooper et al. | Oct. 29, 1935 |
| 2,094,976 | Bachman | Oct. 5, 1937 |

FOREIGN PATENTS

| Number | Country | Date |
|---|---|---|
| 27,030 | Great Britain | Dec. 8, 1902 |
| 325,960 | Great Britain | Mar. 6, 1930 |